3,417,126
METHOD OF PRODUCING MALONONITRILE
Michiichi Taguchi and Susumu Shoji, Neigun, Toyama,
Japan, assignors to Nissan Kagaku Kogyo Kabushiki
Kaisha, Tokyo, Japan, a corporation of Japan
No Drawing. Filed Jan. 14, 1966, Ser. No. 520,652
4 Claims. (Cl. 260—465.8)

ABSTRACT OF THE DISCLOSURE

The method of producing malononitrile which comprises the step of reacting cyanogen chloride with a stoichiometrically excessive amount of acetonitrile, both in the gaseous phase, at a temperature between 700 and 950° C. in the presence of chlorine for from 1 to 15 seconds.

---

This invention relates to a method of producing malononitrile.

A method of obtaining malononitrile from acetonitrile and a cyanogen halide such as cyanogen chloride or cyanogen bromide has already been disclosed in U.S. Patent No. 2,553,406. This method, however, gives a poor yield in that the amount of malononitrile produced is no more than 18% of the cyanogen chloride consumed. Moreover, the reaction takes place at over 525° C. and such rather high tempeartures induce various side reactions which are undesirable. The optimum temperature specified by the patent is 650–700° C. since this reaction takes place at high temperatures, carbon and polymers are segregated within the system as a result of thermodecomposition of the reacting substances and reaction products, thereby lowering the yield of the product sought. According to U.S. Patent No. 2,606,917, the side reaction problem can be solved by introducing into the reaction system a large quantity of inert gas, for instance, carbon dioxide, nitrogen or water vapor, but even this step will not improve the yield. With the molecular ratio between cyanogen chloride, acetonitrile and carbon dioxide at 1:3:7.2, a reaction temperature of 650° C., and a contact time of 6 seconds, the yield of malononitrile remains as low as 16.5%.

The present invention aims at producing a higher yield of malononitrile than can be obtained with the processes described in the above-mentioned U.S. patents by causing acetonitrile and cyanogen chloride to react in the gaseous phase.

In the process according to the invention, in the absence of catalyst, the reaction is carried out at over 800° C., and preferably in the range of 800–950° C. Under these conditions, a yield of 30% of malononitrile or more may be obtained, which far exceeds the yields obtained when using the processes described in the above-mentioned U.S. patents.

Further, applicants have discovered that when the above-mentioned reaction is carried out in the presence of chlorine, malononitrile will be produced with an astonishingly high yield of about 70%. Moreover, in the presence of chlorine as a catalyst, over 20% of malononitrile, which is still better than the conventional yield, can be secured, even when the reaction temperature is lowered to 700° C.

The temperature range giving the maximum yield is 800—850° C. At less than 800° C., the yield, though better than that heretofore secured, is lower than that at the optimum temperature. If the temperature exceeds 850° C., the yield will steadily drop. The chlorine to be introduced as a catalyst into the reaction system will suffice in a small quantity. Even if the chlorine is introduced in an amount more than equal in weight to that of the cyanogen chloride, there will be no appreciable increase in the yield. As a matter of fact, about 1% to about 15% (by weight) of chlorine to cyanogen chloride will ensure a satisfactory increase in yield.

The consumption of acetonitrile should be in excess of the stoichiometrically equivalent amount of cyanogen chloride. There is a tendency for the yield of end product to product to become greater, when the excess of acetonitrile is greater. However, if the quantity of acetonitrile is too excessive, larger quantities of nonreacting acetonitrile will remain, complicating the extraction and refinement of the end product. Moreover, there will be no marked increase in the yield and this is not advantageous economically. Thus, the consumption of acetonitrile should be selected in the range of less than 10 mols to 1 mol of cyanogen chloride. The duration of the reacting contact should be less than 15 seconds, preferably 1 to 10 seconds. If it is shorter than 1 second, the reaction will not be complete, resulting in a low yield. On the contrary, if it is longer than 15 seconds, the reaction products and the end product will be decomposed, which is undesirable.

It has previously been feared that the introduction of chlorine into the reaction system as a catalyst would cause chlorination of the acetonitrile.

However, as is evident from the literature on the chlorination of acetonitrile, for example, U.S. Patents Nos. 2,283,237 and 2,375,545, such chlorination does not readily take place in the temperature range of 700–950° C., even though it may take place in the temperature range of 200–500° C. This has been experimentally confirmed by the present applicants. The reaction mechanism between acetonitrile and cyanogen chloride is not yet clarified, but it is supposed to be of the so-called "radical" type. In this sense, the chlorine in this invention may be called a radical reaction agent acting in the reaction system to accelerate the reaction.

As for the type of device to be employed for this invention, any reactor of the circulation type will serve the purpose, but a tubular one will be preferable. The tube material may be made of quartz or a nickel-base alloy such as Hastelloy C (trademark), or Inconel (trademark), or of some other metal with the inside of the metallic tube coated with alumina. Use of a metallic tube is likely to cause side reactions. For instance, carbon may be segregated and some drop in the yield is observed. Depending on the material of the reactor, either external or internal heating may be adopted. For tubes of Hastelloy C, Inconel or quartz, an external heating device such as a siliconite electric furnace or a direct-heating furnace will be used. For tubes of porclelain or tubes lined with alumina, internal heating will be made through direct induction of an overheated inert gas such as nitrogen or carbon dioxide, or combustion gases.

In the latter case, however, more of gaseous products from the reaction must be disposed of and this will entail an additional burden in separation and refinement and a consequent drop in the yield of malononitrile per unit volume of reactor, which is not always economical.

The reaction should preferably be carried out under atmospheric pressure, but if desired can take place under greater pressure.

The following representative examples show how the process may be carried out.

EXAMPLE I

Nitrogen gas was introduced into acetonitrile which had been heated to 64.5° C., thereby evaporating the acetonitrile. The resulting acetonitrile vapor, together with separately refined cyanogen chloride, was introduced into a quartz reaction tube heated to 810° C., having an inner diameter of 20 mm., length of 1000 mm., and an effective heating length of 500 mm., said tube having within it a 6 mm. outside diameter quartz tube for holding a thermocouple. The two materials were reacted for 6.1 seconds under atmospheric pressure. 81.8 l. nitrogen gas, 160.0 g. acetonitrile and 69.5 g. cyanogen chloride were used for the reaction. The gaseous reaction products were condensed at 15° C. The condensate was analyzed, using a Shimazu GC–1B gas chromatograph according to the internal standard method, with silicon DC550, temperature 170° C., and helium as the carrier. The results showed that 32.4 g. of malononitrile was obtained, the rate of yield on a cyanogen chloride basis being 43.4%.

EXAMPLE II

Using the same reaction tube and the same procedure as in Example I, the reaction was carried out for 5.8 seconds at a temperature of 870° C. For the reaction 165 l. nitrogen gas, 335.0 g. acetonitrile and 160.5 g. cyanogen chloride were used for the reaction. The gaseous products of reaction were disposed of in the same way as in Example I. The content of malononitrile was determined by analysis to be 57.8 g., the yield on a cyanogen chloride basis being 33.5%.

EXAMPLE III

The same type of reaction tube as in Example I was employed, but liquid acetonitrile was supplied through a micro-liquid supply pump. Cyanogen chloride was vaporized and in gaseous form introduced into the reaction tube, the heating temperature being 725° C., under atmospheric pressure, the time of stay in the tube being 6.1 seconds. In this case, however, chlorine was preliminarily added to the cyanogen chloride in the proportion by weight of 1:19 and no nitrogen gas was used. For the reaction, 312.2 g. acetonitrile, 8.2 g. chlorine gas and 156.3 g. cyanogen chloride were consumed. The gaseous product of reaction was condensed at 15° C. Its analysis by the same procedure as in Example I revealed the presence of 46.5 g. malononitrile in it. The yield on a cyanogen chloride basis was 27.5%.

EXAMPLE IV

The same type of reaction tube and the same procedure as in Example III were adopted, but the reaction was carried out at a temperature of 840° C., the reaction period being 6.5 seconds.

The materials consumed were: nitrogen gas 120.0 l., acetonitrile 243.0 g., cyanogen chloride 135.0 g., and chlorine 6.5 g. The gaseous reaction product was condensed in the same way as in Example I to determine the content of malononitrile, which was found to be 97.0 g. The yield on a cyanogen chloride basis was 67.0%.

The experiment of Example I was repeated using the same times, temperatures, equipment and quantities of nitrogen and cyanogen chloride but varying the amount of acetonitrile, as shown in the following table, with the following results:

| Quantity of Acetonitrile, g. | Ratio of acetonitrile to cyanogen chloride in terms of mols | Yield of malononitrile as percent of cyanogen chloride supplied, percent |
|---|---|---|
| 33.0 | 0.7:1 | 14.8 |
| 237.0 | 5.1:1 | 44.9 |
| 555.0 | 12.0:1 | 45.6 |

The experiment of Example I was repeated, using identical times, equipment and quantities of materials, but varying the temperature, with the results shown in the following table:

Temperature, ° C.                          Yield, percent
750 ---------------------------------------- 37.6
840 ---------------------------------------- 42.5
1000 ---------------------------------------- 5.7

The experiment of Example IV was repeated using identical temperatures, operating conditions and quantities of materials except that the quantity of chlorine supplied was varied, with the results shown on the following table:

| Quantity of Chlorine, g. | Ratio by weight of chlorine to cyanogen halide | Yield, percent |
|---|---|---|
| 0 | 0 | 43.0 |
| 2.8 | 0.021:1 | 54.8 |
| 12.9 | 0.096:1 | 67.9 |
| 23.0 | 0.170:1 | 68.5 |

What is claimed is:
1. The method of producing malononitrile which comprises the step of reacting cyanogen chloride with a stoichiometrically excessive amount of acetonitrile, both in the gaseous phase, at a temperature between 700 and 950° C. in the presence of chlorine for from 1 to 15 seconds.
2. The method claimed in claim 1 in which the molar ratio of said acetonitrile to said cyanogen chloride is less than 10.1.
3. The method claimed in claim 1 in which said reaction is carried out at a temperature between 800 and 950° C.
4. The method claimed in claim 3 in which said reaction is carried out at a temperature between 800 and 850° C.

References Cited

UNITED STATES PATENTS 2,553,406    5/1951    Dixon _____ 260—465.8

JOSEPH P. BRUST, *Primary Examiner.*